(12) United States Patent
Villaume

(10) Patent No.: US 6,991,304 B2
(45) Date of Patent: Jan. 31, 2006

(54) METHOD AND DEVICE FOR AUTOMATIC CONTROL OF AN AIRCRAFT DECELERATION IN RUNNING PHASE

(75) Inventor: Fabrice Villaume, Toulouse (FR)

(73) Assignee: Airbus France, Toulouse Cedex (FR)

( * ) Notice: Subject to any disclaimer, the term of this patent is extended or adjusted under 35 U.S.C. 154(b) by 0 days.

(21) Appl. No.: 10/450,214

(22) PCT Filed: Dec. 11, 2001

(86) PCT No.: PCT/FR01/03923

§ 371 (c)(1),
(2), (4) Date: Jun. 10, 2003

(87) PCT Pub. No.: WO02/47977

PCT Pub. Date: Jun. 20, 2002

(65) Prior Publication Data

US 2004/0026992 A1 Feb. 12, 2004

(30) Foreign Application Priority Data

Dec. 12, 2000 (FR) .................................. 00 16147

(51) Int. Cl.
*B60T 8/86* (2006.01)
(52) U.S. Cl. ........................ 303/126; 244/111
(58) Field of Classification Search ................ 303/126, 303/195, 113.5; 701/17, 19, 15, 16; 244/111
See application file for complete search history.

(56) References Cited

U.S. PATENT DOCUMENTS

| | | | | | |
|---|---|---|---|---|---|
| 3,920,282 | A | * | 11/1975 | DeVlieg | 303/113.5 |
| 4,316,252 | A | * | 2/1982 | Cooper | 701/16 |
| 4,367,529 | A | * | 1/1983 | Masclet et al. | 701/79 |
| 4,454,582 | A | * | 6/1984 | Cleary et al. | 701/15 |
| 5,024,491 | A | * | 6/1991 | Pease, Jr. et al. | 303/195 |
| 5,142,478 | A | * | 8/1992 | Crook | 701/16 |
| 5,951,122 | A | * | 9/1999 | Murphy | 303/163 |
| 5,968,106 | A | * | 10/1999 | DeVlieg et al. | 701/70 |
| 6,092,919 | A | * | 7/2000 | Calise et al. | 364/148.03 |

FOREIGN PATENT DOCUMENTS

| | | |
|---|---|---|
| EP | 0 025 614 | 7/1980 |
| EP | 0 505 236 A2 | 3/1992 |
| EP | 0 895 929 A2 | 8/1998 |

* cited by examiner

*Primary Examiner*—Matthew C. Graham
*Assistant Examiner*—Mariano Sy
(74) *Attorney, Agent, or Firm*—Thelen Reid & Priest

(57) ABSTRACT

The invention relates to a system to control the deceleration of an aircraft during the taxiing phase on a landing strip, the system has a detector of the current position of the aircraft on the strip, and of the current speed of the aircraft on the strip, a calculator receiving position and speed values from the detector, to define, as a function of the desired final speed of the aircraft at the so-called final position on the strip, a deceleration set-point modification time, after the current time, and a new deceleration set-point to apply from the modification time, to reach the final position at the desired speed.

10 Claims, 2 Drawing Sheets

METHOD AND DEVICE FOR AUTOMATIC CONTROL OF AN AIRCRAFT DECELERATION IN RUNNING PHASE

CROSS-REFERENCE TO RELATED APPLICATION

This application claims priority based on International Patent Application No. PCT/FR01/03923, entitled "Method And system For The Automatic Control Of Aircraft Deceleration During The Taxiing Phase" by Fabrice Villaume, which claims priority of French application no. 00/16147, filed on Dec. 12, 2000, and which was not published in English."

FIELD OF THE INVENTION

The present invention relates to a method and system for the automatic control of the deceleration of an aircraft during the taxiing phase.

A distinction is generally made, when an aircraft is being landed, between three steps which are: the approach phase, impact and the taxiing phase of the aircraft on a landing strip. The taxiing phase is used to decelerate the aircraft, so as to enable it to turn into an exit junction of the landing strip, thus freeing said strip.

Due to chronic congestion in airports, and the costs associated with the use of landing strips, efforts have been concentrated on reducing the time during which they are occupied by aircraft.

STATE OF THE RELATED ART

At the present time, a number of large carrier aircraft are equipped with an automatic braking system which makes it possible to set a predetermined deceleration set-point. Generally, three or five braking levels are provided. These levels are, for example, "low", "medium", and "high". The high braking level is not used under normal conditions, but only in the event of emergency braking. The braking levels are pre-defined and do not account for the strip condition and layout or weather conditions.

The use of predetermined braking set-points does not make it possible to optimise the strip occupation time on landing.

Through the document EP A 0 895 929, a perfected automatic braking system is also known which accounts for the distance separating the point of impact of the aircraft on the strip and the parking or exit position. It also accounts for the current speed of the aircraft and its final speed (which may be zero). According to this document, a deceleration given by the following formula is applied to the aircraft:

$$\left| \frac{V_{final}^2 - V^2}{2L} \right| \quad (1)$$

In this expression, $V_{final}$, V and L respectively refer to the final speed of the aircraft at the end of the strip, the current speed of the aircraft and the distance separating the final position from the aircraft's current position.

A more detailed description of the calculation of the deceleration given by formula 1 can be found in the document referenced above.

The automatic braking system makes it possible, at least in a number of cases, to reduce the landing strip occupation time compared to systems with constant and predetermined braking levels.

The aim of the present invention is to propose a deceleration control method and system making it possible to optimise braking even further and reducing landing strip occupation time even further.

A further aim is to propose such a method and such a system capable of being installed or being used on aircraft not initially equipped.

DESCRIPTION OF THE INVENTION

To achieve these aims, the invention more specifically relates to a system to control the deceleration of an aircraft during the taxiing phase on a landing strip, the system comprising:
  acquisition means of the current (instantaneous) position of the aircraft on the strip,
  acquisition means of the current (instantaneous) speed of the aircraft on the strip,
  calculation means (102), receiving position and speed values from the acquisition means, to define, as a function of the desired final speed of the aircraft at the so-called final position on the strip, a deceleration set-point modification time, after the current time, and a new deceleration set-point to apply from the modification time, to reach the final position at the desired speed.

The above-mentioned final position is, for example, the position of an exit junction of the landing strip. The aircraft must reach this position at a sufficiently low final speed to leave the strip in complete safety. The desired value of the final speed along with the final position are data that can be determined beforehand and saved in a memory of the calculation means, for example.

As the deceleration value modification time is after the so-called current time, the aircraft covers a specific distance before the new deceleration set-point is applied.

At the moment of impact, i.e. when the current time coincides with the landing gear coming into contact with the strip, no taxiing phase deceleration set-point is applied to the aircraft. If applicable, a predetermined low deceleration set-point may be applied. Therefore, the aircraft only undergoes, initially, low deceleration corresponding to the aerodynamic braking or a predetermined set-point braking, if applicable. In this way, it covers an initial portion of the landing strip at a high speed, at least until the deceleration set-point modification time. From this time, the braking means are really implemented. More specifically, the braking means are implemented to the extent required to reach a desired speed at the set final point. By delaying the deceleration set-point modification time, it is possible to cover a greater portion of the strip at a higher speed and therefore reduce the strip occupation time. The deceleration of the aircraft increases according to the distance of the deceleration set-point modification time(s) with respect to the impact time.

In one particular embodiment of the invention, the calculation means may be equipped with a neural network type computer, capable, during a learning phase, to find a balance between an optimal reduction of the taxiing time and safety and comfort requirements for aircraft passengers.

The term aircraft braking means refers to any equipment intended to decelerate the aircraft during the taxiing phase. These means may comprise disk brakes acting on the wheels of the landing gear or possibly so-called propeller thrust inversion devices. The braking means may also comprise other aerodynamic braking devices such as ground spoilers or a tail parachute.

The deceleration value to be applied to the aircraft from the set-point modification time may be obtained, for example, according to a law comparable to that given by equation 1. However, in this equation, V is no longer the current speed of the aircraft, but the estimated speed at the set-point modification time, and L is no longer the distance separating the current position from the final position, but the distance separating the estimated position at the set-point modification time and the final position.

According to one particular aspect of the invention, the control system may comprise continuous acquisition means of the current position and current speed of the aircraft, and continuous calculation means of new deceleration set-points.

By means of the continuous calculation of new deceleration set-points and, if applicable, new set-point modification times, it is possible, after the first set-point modification time, to correct the deceleration or adjust it so as to reach the final position at a speed corresponding as precisely as possible to the desired speed, independently of the weather condition and independently of the condition of the landing strip.

According to another particular aspect of the invention, the current position acquisition means may comprise a GPS (global positioning system) type system. In addition, the current speed acquisition means may comprise an IRS (inertial reference system) type speed measurement system specific to the aircraft.

The invention also relates to braking equipment for an aircraft liable to land on a landing strip and equipped with a deceleration control system as described above.

The equipment may also comprise an anti-blocking system connected between the deceleration control system and the brakes acting on the wheels of the aircraft, to prevent any blocking of wheels.

Finally, the invention relates to a method to control the deceleration of an aircraft running on a landing strip, between at least a current position of the aircraft occupied at a current time, at which said aircraft has a current speed, and a final position at which the aircraft must have a determined final position, wherein a deceleration set-point modification time, after the current time, and a new deceleration set-point applied from said set-point modification time, are determined as a function of the current position, the current speed and the final speed, in order to reach the final position at the determined speed. The final position is, for example, an exit junction of the landing strip.

Other characteristics and advantages of the invention will emerge from the following description, with reference to the appended figures. This description is given for purely illustrative purposes and is not exhaustive.

DETAILED DESCRIPTION OF EMBODIMENTS OF THE INVENTION

Figure 1:
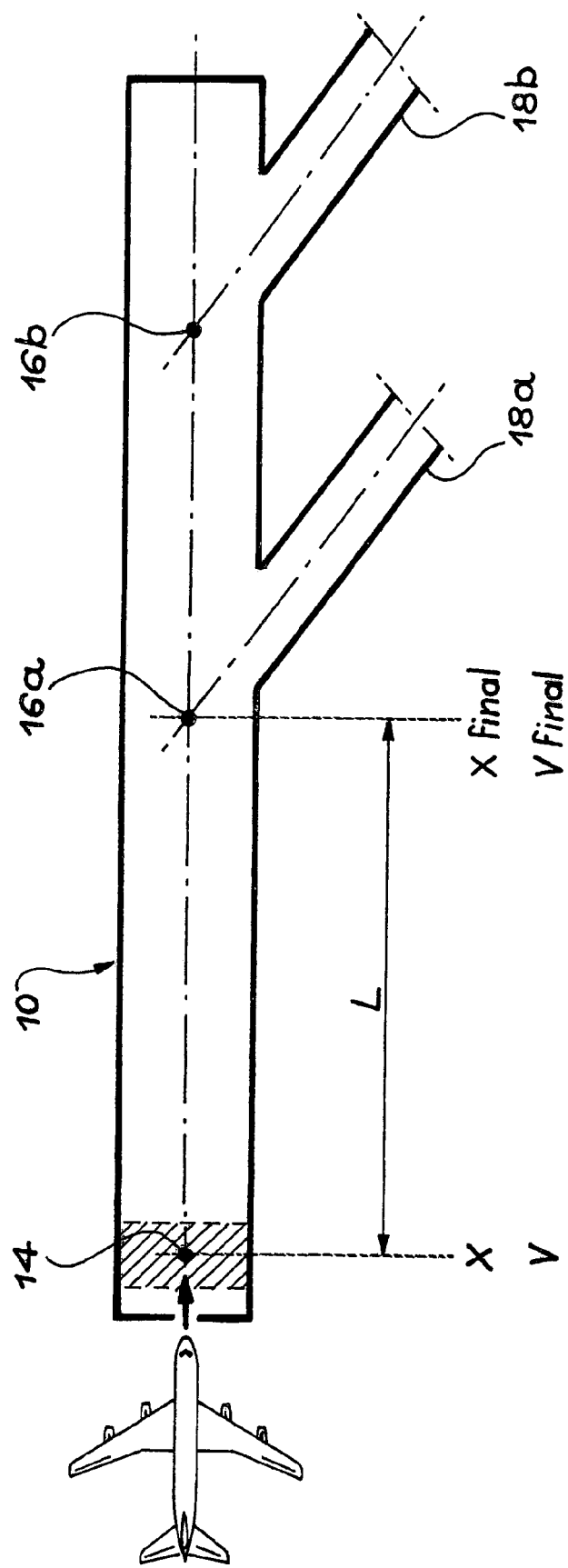
FIG. 1 is a schematic representation of a landing strip showing the main parameters taken into account for the calculation of the deceleration of an aircraft according to the invention.

FIG. 1 schematically represents a landing strip 10 approached by an aircraft in the direction indicated by an arrow after an approach phase.

The deceleration of the aircraft during the approach phase does not come within the scope of the invention. The aircraft deceleration control method, according to the invention, relates to the taxiing phase which takes place on the strip 10 from an impact point 14 in an impact zone, up to a point 16a or 16b from which the aircraft starts to leave the strip 10.

In the example in the figure, the strip comprises two exit junctions 18a and 18b that an aircraft can take by deviating its trajectory from points 16a and 16b, respectively. These points are hereafter referred to more simply as "exit points".

The choice of taking the first or second exit junction essentially depends on the type of aircraft, and possibly the landing conditions. The first exit 18a will be considered to have been taken.

The aircraft reaches the impact point 14 of the linear coordinate X at a speed V. Its deceleration must be sufficiently high for its final speed at the exit point 16a to have a predetermined value $V_{final}$, adapted to the change of direction of its trajectory in the exit junction 18a. To change from the initial speed to the final speed, the length L of the taxiing path is L=$X_{final}$-X where $X_{final}$ is the linear coordinate of the exit point.

The impact position and speed coordinates X, V are acquired by equipment, onboard or not, known to those skilled in the art. It consists of, for example, GPS (global positioning system), IRS (internal reference system) type equipment, accelerometers, telemeters, etc. It is important to note that the impact position and speed parameters X and V may be objective parameters effectively measured at the impact time, but may also be estimated parameters calculated on the basis of the speed, position and possibly the deceleration of the aircraft before impact on the strip, or possibly after impact.

The position and the speed of the aircraft at impact may represent the "current" position and the "current" speed within the scope of the invention, to calculate the deceleration set-point. Also in relation to this point, it is important to note that a position occupied by the aircraft and a speed of the aircraft, after those of the impact, may also be suitable for the calculation of a first deceleration set-point.

As described above, a deceleration set-point is determined on the basis of the parameters X and V, and more specifically, on the basis of the parameters $X_{final}$-X and $V_{final}$-V.

According to the invention, the deceleration set-point is not applied immediately but after a certain time.

Figure 2:
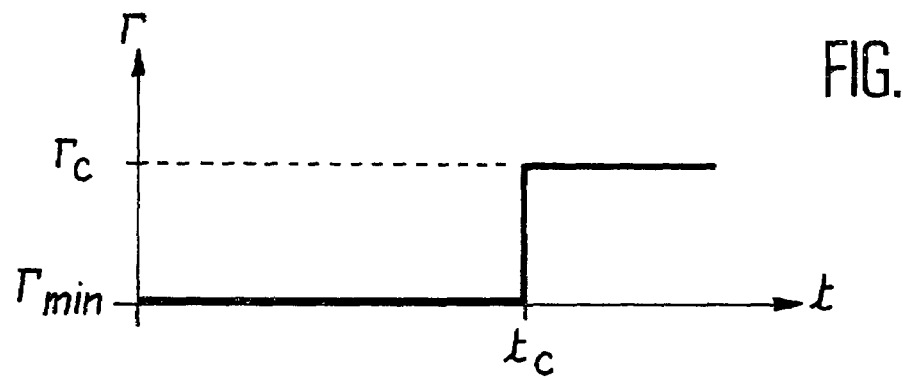
FIG. 2 is a graph showing, as a function of time, measured from the impact of an aircraft onto the strip, the variation of a deceleration set-point applied to an aircraft braking system according to the invention.

FIG. 2 shows the representation of the variation of the deceleration set-point which would be obtained by applying the method according to the invention only once after an aircraft has touched the landing strip.

The Y-axis shows the deceleration set-point Γ, which corresponds, for example, to a braking torque applied to the wheels of the landing gear. In addition, the Y-axis coincides with a time origin, taken, for example, at impact of the aircraft on the strip.

Firstly, a minimum braking torque, referred to as $\Gamma_{min}$, is applied to the wheels. $\Gamma_{min}$ may be, depending on the case, a low set-point value, possibly zero, or, in the case of an iterative use of the method, a value corresponding to a previously defined deceleration set-point.

After a delay interval, at a time $t_c$, the deceleration set-point is modified. A new braking torque $\Gamma_c$ is applied to wheels. The value $\Gamma_c$ is defined as a function of the previously acquired position and speed parameters, such that the desired final speed can be reached at the level of the exit point 16a of the landing strip.

The calculation of the necessary deceleration may be carried out, for example, on the basis of movement equations according to the following general formula:

$$V_{final} = a.t + V, \text{ and}$$

$$X_{final} = X + V.t + a/2.t^2$$

In these equations, a represents deceleration and t time. Depending on the case, the time must be counted from the modification of the deceleration set-point, accounting for, if applicable, any deceleration prior to the set-point modification time.

According to more complex models, the calculation of the deceleration may account for other parameters such as characteristic friction coefficients of the surface condition of the landing strip, the lift, etc.

Finally, according to another further possibility, which will be described in more detail hereafter, the delay interval and the deceleration set-point may be defined by a neural network computer accounting for prior parameter learning.

FIG. 2 corresponds to an example of a particularly simplified embodiment of the invention wherein only two deceleration set-points $\Gamma_{min}$ and $\Gamma_c$ are taken into consideration. As can also be seen hereafter, an iterative or continuous embodiment of the method makes it possible to readjust the deceleration set-point several times, or even continuously.

Figure 3:
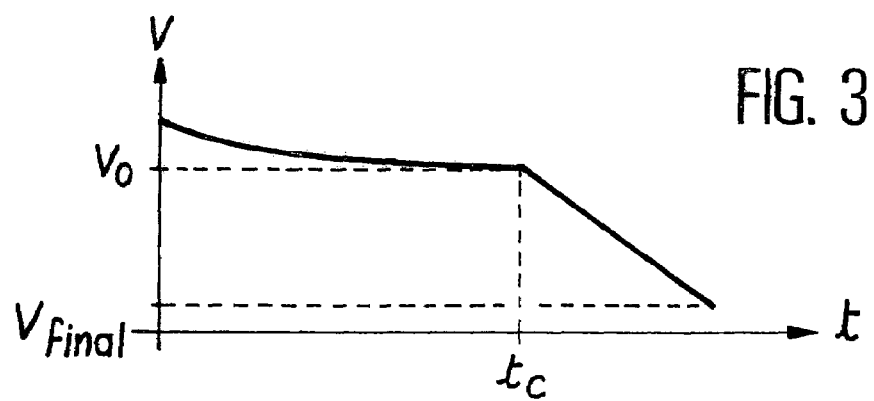
FIG. 3 is a graph showing the variation of the aircraft speed on the landing strip, as a function of time, accounting for the deceleration set-point in FIG. 2.

FIG. 3 shows, in the form of a graph, the variation of the speed of an aircraft landing on the landing strip and to which the deceleration set-points in FIG. 2 are applied. The Y-axis which gives the speed V as a function of time also coincides with the impact time, in the example described.

It can be seen that, between the impact time and the deceleration set-point modification time $t_c$, the speed only falls slowly.

Indeed, up to the time $t_c$, the aircraft only undergoes aerodynamic braking and, at the very most, very weak braking on the wheels.

However, from the time $t_c$, the aircraft undergoes a deceleration a due to the braking torque $\Gamma_c$.

If $V_0$ is taken to be the speed of the aircraft at the time $t_c$, said speed will decrease roughly according to the equation mentioned above, or more specifically:

$$V = V_0 - a.(t - t_c).$$

The braking set-point is such that the final speed $V_{final}$ is reached at the level of the strip exit junction.

It can be seen in FIG. 3 that, the later $t_c$ is, the shorter the taxiing time of the aircraft on the strip will be, due to its high speed. However, this results in a greater deceleration. To this end, the deceleration set-point calculation means may be controlled or programmed so as to define the time and deceleration value as a compromise between passenger comfort requirements and strip occupation time reduction requirements. The values also depend on the selected exit junction.

It is possible for example to prioritise late but high decelerations when an airport is very congested and to apply more gradual and comfortable set-points in less busy situations.

Figure 4:
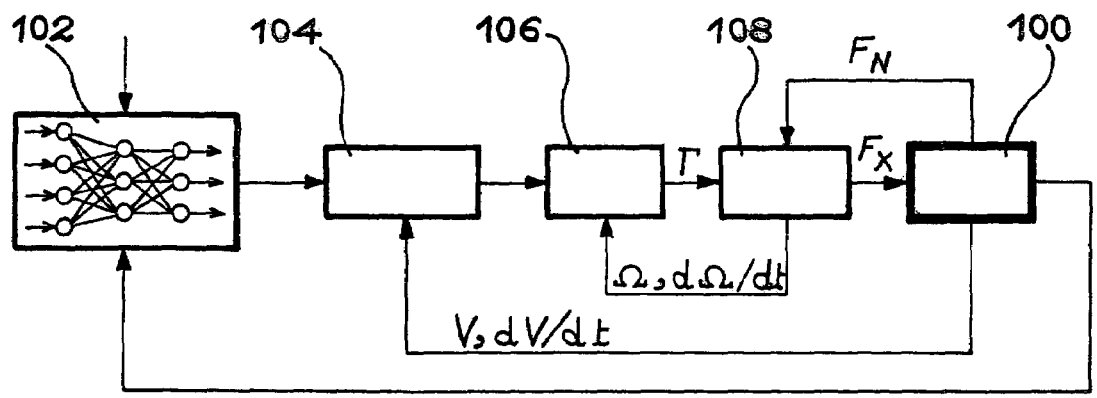
FIG. 4 is a schematic representation of braking equipment showing the main components of a deceleration control system according to the invention.

FIG. 4, described below, shows, in block form, the main components of an item of braking equipment and illustrates a particular embodiment of the invention.

Reference 100 jointly refers to the aircraft and dynamic speed and position parameter acquisition means equipped therein. The acquisition means are capable of continuously calculating particularly the current position and current speed X and V mentioned above.

These parameters are sent to a neural network calculation unit 102. It consists of, for example, a conventional neural network composed of three layers of cells operating according to a gradient back propagation learning method.

The function of the neural network is to define the deceleration set-points and the modification times for said set-points. It may also have other additional functions. For example, in the approach phase, before landing, it may be used as a prediction tool to determine the exit junctions of the landing strip liable to be reached according to the aircraft flying conditions (centering, weight, etc.), weather conditions, and possibly the condition of the landing strip. The transmission of these parameters to the neural network is shown in FIG. 4 in a simplified manner by an arrow.

The deceleration set-points produced by the computer 102 are sent to a braking system 104, which, in the example described, acts on the wheels of the main aircraft landing gear. More specifically, the deceleration set-points are sent to the braking system via an anti-blocking system intended to prevent wheel blocking. Such an anti-blocking system is known to those skilled in the art and is therefore not described in detail here.

Finally, the braking system exerts on the wheels a braking torque $\Gamma$ as examined above with reference to FIG. 2.

An arrow $F_x$ shows the action of the braking of the wheels on the aircraft and particularly on the speed and position parameters. An arrow $F_N$, on the other hand, shows the dynamic action of the aircraft on the wheels (ground spoilers, aerodynamic behaviour, etc.).

A first retro-control can be carried out between the wheels 108 of the landing gear and the braking system 106, by correcting the braking torque as a function of wheel rotation speed and wheel rotation speed variation data ($\Omega$, $d\Omega/dt$).

A second retro-control can be carried out between the aircraft taxiing parameter acquisition system and the anti-blocking system 104. In this case, speed and acceleration data (V, dV/dt) is sent to the anti-blocking system.

Finally, the main retro-control can be carried out between the aircraft taxiing parameter acquisition systems and the neural network computer 102. At any time, the new current position and speed values make it possible to verify, by means of estimation, whether the final speed can actually be reached at the level of the selected strip exit junction. If this is not the case, a new deceleration set-point may be defined.

This retro-control may be continuous by continuously adjusting the deceleration set-point, at the very least after the first set-point modification time.

Reference
(1) EP A 0 895 929.

The invention claimed is:

1. System to control deceleration of an aircraft during taxiing phase on a landing strip, the system comprising:
    acquisition means of a current position of the aircraft on the landing strip, acquisition means of a current speed of the aircraft on the landing strip, calculation means of a deceleration set-point modification time, after a time of impact of the aircraft on the landing strip, and a new deceleration set-point to apply from said modification time, to reach a final position, which corresponds to an exit junction of the landing strip, at a desired final speed, which is not nil, receiving position and speed values from the acquisition means, and accounting for said desired final speed of the aircraft in said final position.

2. System according to claim 1, comprising continuous acquisition means of the current position and current speed of the aircraft, and continuous calculation means of a new deceleration value.

3. System according to claim 1, wherein the current position acquisition means comprise a GPS (global positioning system) type system.

4. System according to claim 1, wherein the current speed acquisition means comprise an IRS (inertial reference system) type speed measurement system specific to the aircraft.

5. System according to claim 1, wherein the calculation means comprise a neural network computer.

6. Braking equipment for an aircraft equipped with a control system according to claim 1.

7. Braking equipment according to claim 6, comprising an anti-blocking system connected between the calculation means and a wheel braking system on the aircraft.

8. Method to control deceleration of an aircraft running on a landing strip, between at least a current position of the aircraft occupied at a current time, at which said aircraft has a current speed, and a final position, which corresponds to an exit junction of the landing strip, at which the aircraft must have a determined final position and a final speed, which is not nil, wherein a deceleration set-point modification time, after time of impact of the aircraft on the landing strip, and a new deceleration set-point applied from said set-point modification time, are determined as a function of the current position, the current speed and the final speed, in order to reach the final position at the final speed.

9. Method according to claim 8, wherein the current position and speed of the aircraft are measured continuously, and wherein a new deceleration value is defined continuously.

10. Method according to claim 9, wherein a deceleration modification time is also defined, when the deceleration set-point is not yet applied.

* * * * *